United States Patent [19]

Fears

[11] Patent Number: 5,380,128

[45] Date of Patent: Jan. 10, 1995

[54] METHODS OF, COATINGS AND LININGS FOR WATER INTAKE SYSTEM COMPONENTS AND OTHER EQUIPMENT EXPOSED TO A MARINE ENVIRONMENT

[76] Inventor: Clois D. Fears, 487 Cole Rd., Murrysville, Pa. 15668

[21] Appl. No.: 844,502

[22] Filed: Mar. 2, 1992

Related U.S. Application Data

[63] Continuation-in-part of Ser. No. 790,259, Nov. 8, 1991.

[51] Int. Cl.[6] .................................................. F16L 1/26
[52] U.S. Cl. .................................. 405/157; 405/127; 405/158; 405/211
[58] Field of Search ...................... 405/52, 127, 195.1, 405/211, 211.1, 216; 405/154, 158, 184, 157

[56] References Cited

U.S. PATENT DOCUMENTS

| | | | |
|---|---|---|---|
| 4,616,955 | 10/1986 | Wallace et al. | 405/158 |
| 4,728,223 | 3/1988 | Rice | 405/154 |
| 4,848,964 | 7/1989 | Yarnell | 405/154 |
| 4,954,016 | 9/1990 | Storgard | 405/184 |

OTHER PUBLICATIONS

"A Case History of Biofouling Control at Virginia Power's Yorktown Generating Station", J. W. Thornton and D. S. Morelen, Virginia Power, Yorktown, Virginia.
"Invasion of the Zebra Mussel", The Atlantic Monthly, Jul. 1990, pp. 8–87.
"Invasion of the Zebra Mussel", Discover, Jan. 1991, p. 44.
"Zebra Mollusks: A Danger of a Different Stripe", Electrical World, Dec. 1990, pp. 72–74.
"EPCO-TEK 2000", Hi-Tek Chemical Corporation.
"EPCO-TEK 1000/2000", Hi-Tek Chemical Corporation.
"Sticky Situation-A Mussel Invasion Threatens the Great Lakes", Macleans, Aug. 1990.
"Macrofouling Control", Nalco Chemical Company and Northern Ireland Electricty.
"Showdown at Mussel Beach-Marauding crustaceans terrorize the Great Lakes", Newsweek, Nov. 20, 1989, p. 66.
"Ballast Water Stowaways", Sea Frontiers, Jun. 1991, p. 23.
"Dreissena Disaster: Scientists battle an invasion of zebra mussels", Science News, vol. 139, May 1991, pp. 282–284.
"Invasion of the Zebra Mussel", Time, Jan. 1991, pp. 63–64.
"Striped Menace: Zebra Mussels Found in Mississippi River; Minnesota Lakes Next Likely Target, Says Expert", Underwater USA, Nov., 1991, p. 20.
"Why Copper is Anti–Fouling", Hi–Tek Chemical Corporation.

*Primary Examiner*—David H. Corbin
*Attorney, Agent, or Firm*—James Ray & Assoc.

[57] ABSTRACT

A method and material for the manufacturing or retrofitting of fluid transport systems. The material chosen for the lining, or the pipe itself, will be selected based on physical properties such as a high impact strength and a low coefficient of friction. The low coefficient of friction will be essential to prevent the initial adhesion of foreign substances to the inner surface of pipes. In particular, an improved pipe composite will be useful in the lining or construction of water intake pipes where there is a well-recognized problem of the buildup of foreign substances including algae and other marine microorganisms. Therefore, by preventing buildup, the present invention will provide a more economical and efficient method to maintain the overall piping system.

6 Claims, 2 Drawing Sheets

METHODS OF, COATINGS AND LININGS FOR WATER INTAKE SYSTEM COMPONENTS AND OTHER EQUIPMENT EXPOSED TO A MARINE ENVIRONMENT

CROSS REFERENCE TO RELATED APPLICATION

This is a continuation in part of patent application Ser. No. 07/790,259, filed Nov. 8, 1991, titled "METHOD OF AND LINING FOR WATER INTAKE PIPES" and a Preliminary Amendment filed Jan. 16, 1992.

FIELD OF THE INVENTION

The present invention relates, in general, to fluid transport systems and, more particularly, this invention relates to both methods of and material for the lining, coating and/or the manufacture of water intake pipes and other equipment disposed beneath the surface of the water which will significantly reduce the adherence to and build up of detrimental foreign substances, including but not limited to marine micro organisms, on the exposed inner surface of such water intake pipes and the exposed surfaces of such other equipment, thereby providing both an economical and an efficient method to maintain operational the overall water intake piping system and other equipment disposed in a marine environment.

BACKGROUND OF THE INVENTION

In modern power generation plants and other manufacturing industries requiring large volumes of water, it is a well recognized problem that there is a potential loss of water from the adherence to and buildup of a variety of foreign substances on the exposed surfaces of fluid transport systems. Such surfaces of the fluid transport systems include, but are not necessary limited to, the inner surfaces of the water intake pipes, valves, fittings, heat exchangers, etc, and the outer surfaces of screens (rotary & bar), etc. Power generating plants and other manufacturing facilities which require the use of a particular fluid medium, such as fresh water, have long sought an effective method of keeping the fluid transport system operational and free of any buildup of foreign organisms or debris.

One such foreign organism of particular concern and discovered recently is the Zebra Mollusks. Such Zebra Mollusks are better known in the art as Zebra Mussels. See, for example, an article published in the Dec. 1990 issue of "Electrical World" on pages 72-74 and another article published in the Jul. 1990 issue of "The Atlantic Monthly" on pages 81-87. The disclosures of these particular articles are incorporated herein by referenced thereto.

Prior to the present invention, when the fluid transport systems of current technology exhibit diminished capacity due to clogging by foreign substance buildup, one method of servicing a submerged piping system would be to have a person use a dragging device to pull through the fluid transport system to dislodge the buildups or clogs and subsequently pull them through to the exit for manual cleanup. Drawbacks to this prior art method are readily apparent and would include the fact that this method is not only labor-intensive but also time-consuming. Also this method cannot be accomplished continuously, but must be done on a regularly scheduled basis.

Another possible cleaning method used for facilities, such as water treatment plants, includes flushing the fluid transport system with relatively large quantities of chemicals such as chlorine or potassium chloride. While this process can be conducted in a continuous manner, it is not efficient or cost-effective to induce large quantities of chemicals into the desired fluid medium which in some cases may be detrimental and must later be separated out.

As discussed in the above-referenced articles, three types of problems have been identified with Zebra-Mussel fouling in water intake systems. Initially, layers of attached mussels will reduce or block flow, even through large-diameter piping, trash racks, and traveling screens. Eventually, shells or clumps of shells breaking free of their attachment sites can block openings in piping, heat exchangers, strainers, or traveling screens. Finally, attachment points accumulate other debris and serve as sites for corrosion.

There are three EPA-approved chemical methods that have been tried in US powerplants-chlorination, the most discussed method; bromination, primarily Acti-brom, a Nalco Chemical Co (Naperville, Ill.) product; and Betz Laboratories' (Trevose, Pa.) Clam-trol. Several other chemical treatments have been tried in laboratory tests, but not in a utility or industrial environment. Chlorination is the most common chemical control for Zebra-Mussel fouling. Continuous chlorination at 0.3 ppm for up to three weeks is required to achieve efficacy. Intermittent chlorination programs, that feed a few hours daily have been found to be ineffective. Using other chemicals-such as ozone, hydrogen peroxide, and potassium permanganate is possible, but expensive, environmentally unsound, and/or impractical to distribute throughout a cooling system. It has been reported that Detroit Edison is trying to control mussels by scraping and hydroblasting during regular maintenance. Janiece Romstadt has received federal permission to use a commercial mollucicide. Ontario Hydro is treating some of its coolant with hypochlorite, an oxidant that chews away at the soft parts of the organism and is the active ingredient in household bleach; the utility admits, however, that this short-term solution is offensive to a public anxious about the environment. One alternative is ozonation. Like hypochlorite, ozone is an oxidant; it is also environmentally benign. But it is extremely expensive. Ontario Hydro estimates that ozonation would cost it $9 million per plant.

One member, of the U.S. Fish and Wildlife Service, puts the bill for re-engineering, maintenance, and other forms of mussel abatement at almost half a billion dollars a year. But none of the emergency measures, though they may alleviate specific problems here and there, will do anything to halt the overall proliferation of Zebra Mussels. The mussels are very strongly byssate and they will attach to insides and occlude the openings of industrial and domestic pipelines, clog underground irrigation systems of farms, greenhouses, and any other facility that draws water directly from the Great Lakes, encrust navigation buoys to the point of submerging them, and encrust, hulls of boats and other types of sailing craft that remain in the water over the summer and fall. The mussels may also become a significant vector of parasites that are lethal to game species of waterfowl and fish.

In the November 1991 issue of "Underwater USA" a news article appeared which indicated that, the tiny but dreaded Zebra Mussel has been discovered for the first time in a section of the Mississippi River near La Crosse, Wis., a U.S. Fish and Wildlife Service toxicologist reports.

One expert says that he expects to see the Zebra Mussel population explode by next year. Worse, it's likely boaters will inadvertently introduce the Zebra Mussels to Minnesota lakes.

The mussels have an extremely hard shell and clog water intakes at power plants and municipal water systems.

The Monroe, Mich., water supply was crippled for three days when the mussels clogged all intake pipe. Water bills increased 18 percent to pay for removing them.

An Ontario electric company spent $10 million on chlorine to keep the mussels out of power plant water intake pipes.

This expert expects the same things to happen at power and water plants on the Mississippi. He says locks and dams also are favored by the mussels, which cause leaks and prevent gates from closing completely.

Another material being marketed to control marine fouling of boat hulls was developed by a chemical company in the eighties. Use of this material, however, is difficult. It requires a considerable amount of preparation of the substrate. According to the manufacturer's instruction sheet, for example, all previous bottom paint must be removed down to a gelcoat. If an epoxy barrier coat has been previously applied, the barrier coat must be profiled with a sand-blaster or wet blaster using 40 F grit or ground using 60-80 grit paper. The waterline should be preserved using duct or similar tape. The top sides should be masked to protect against etching and overspray. The blasted surface should be vacuumed and wiped thoroughly. The hull is then inspected for blisters and defects. Any defects discovered are repaired using conventional repair techniques. Any repair required is done using any standard 2 part epoxy base repair material. A polyester resin base repair material cannot be used.

Fairing of the repaired areas is then done. Any unfaired areas will be very apparent in the finished hull and will make activation of the material difficult. Grit and dust are then removed with an acetone tack cloth. The moisture in the hull, as determined by a Sovereign model 452B or similar moisture meter, must have a reading below 12 and the reading should be reduced to as close to 5 as practical. Because this material is an excellent moisture barrier any moisture Left in the substrate will be trapped and react with unreacted solvents in the polyester substrate resulting in blister formation.

The next step is an application of primer. This primer is a very low viscosity, 100% epoxy undercoat. Like wood preservative it has very high "wicking" characteristics. Only one light coat is required. It may be sprayed without thinning. A quart will cover approximately 400 square feet (approximately the wetted surface of a 42 foot full keel sailboat.) This is a tack coat and should be applied similar to a wax as opposed to a paint application. A thick coat will cause a top coat of the material to run and bleed. The primer will cure to a "tacky" surface in 3 to 4 hours. It is only to be used as an undercoat and will oxidize if not covered with a finish coat The finish coat may be applied any time after the surface becomes "tacky" to touch, but within the 8 hour window.

Preparation of the coating material is now ready. This material is subject to settling; seven different ingredients are used to obtain its unique qualities of strength, flexibility, electrical-resistance, and anti-fouling properties. To assure uniformity Part A of the material must be thoroughly mixed to a uniform "cake icing" consistency before adding Part B, the hardener. Mixing should be done using an electric drill and a paint mixing agitator. It is good practice to mix Part A each time prior to removing sub-lots from the primary container. Care must be taken when mixing the material in the plastic container. The agitator should have no protruding edges that might cut the plastic. Plastic slivers may get in the mix and ultimately clog the spray nozzle. In addition, the hardener must be thoroughly mixed before adding to Part A. Three parts by volume of Part A, the epoxy base, is mixed with 1 part by volume of Part B, the activator. At 70 degrees F the mixture has the consistency of dry wall joint compound. Heated to 110 degrees F the consistency is that of latex paint. The pot life at 70 degrees F is about 1 hour, and at 105 degrees F is about 20 minutes.

The material is now ready for application. One serious drawback of this material is that careful attention must be paid to the material's application window; the material should be applied while the primer is still "tacky". If the application window is missed, the surface should be re-profiled with 60-80 grit sandpaper, cleaned, and lightly covered again with the primer before proceeding. The material is applied using a standard cup gun commonly used in automobile painting. Add Part A and Part B to the cup in the proper proportion and blend. Add 15-20% solvent to the cup and close immediately.

Mix the components by shaking and swirling the gun. Spray using 60-80 psi air pressure.

A 0.001-0.002 inch thick tack coat is first sprayed over the primer and then followed in 10-45 minutes by a 0.004-0.005 inch thick coat. Following with a full 0.003-0,005 inch coat until a finish thickness of 0.017-0.020 inch is obtained. Re-coats may be applied every 10-15 minutes at 70 degrees F. Runs may occur if coats are too thick, subjected to very warm environments, or exposed to direct sunlight. Another disadvantage of this material is that operator judgement is critical when application is done at less than ideal conditions.

If the cup gun does not have an agitator, the gun must be frequently shaken with a rapid wrist motion to keep a uniform mixture. A pressure pot may be used for larger jobs. A Bink's model 7 gun, a 2 gallon Bink's pot with agitator, model #83-5508, air regulator model #85-204 and a 38 PM nozzle combination has been used successfully. The 38 PM nozzle is quite large (about 0.086") and the applicator may prefer a nozzle in the 0.060 range to obtain greater control of film thickness.

The material is allowed to cure for twenty-four to forty-eight (24 to 48) hours, depending on ambient conditions, before activating. This activation step is very important, because barnacles will grow on unactivated material. Lightly sandblasting, either wet or dry, with 40 F grit or finer will activate the surface or lightly sand with 220 wet/dry paper to remove blush. The longer the cure time before activating the easier it is to activate successfully. The material will continue to cure for a week at 70 degrees F.

The boat may be put in the water anytime after activating. Although the material is formulated for highly moist environments and will cure under water, it should not be applied to damp surfaces.

Therefore, it is apparent that it is desirable to create a fluid transport system in which the pipes and other system components are manufactured, or lined, or coated with a material which would substantially minimize the initial adherence to and eventual buildup of foreign substances on the inner surfaces of the pipes and the exposed surfaces of other system components while they are submerged in a fluid medium. It is also apparent that it is desirable to develop a material which can be coated on buoys and boats to prevent attachment of the Zebra Mussel or other marine organisms thereto.

SUMMARY OF THE INVENTION

The present invention provides methods and materials for retrofitting and/or manufacturing a fluid transport system submerged within a particular fluid medium with a lining or coating. The retrofit can be accomplished while the pipes and other system components are submerged within the given fluid medium. In the case of a linking, composed of a preselected lining or coating material, it must be capable of substantially minimizing both detrimental adherence to and the buildup of foreign substances on an inner surface of the pipe or other structure; thereby alleviating the problems associated with foreign substance buildups which restrict the flow of the fluid medium therethrough. The preselected lining or coating material can be selected from a variety of possible materials, including, but not limited to, ultrahigh molecular weight polyethylene, polytetrafluoroethylene, a lubricating paint or a marine epoxy impregnated with at least one of copper, organotin, and mixtures thereof. Key considerations for selecting the appropriate lining or coating material will be features such as the coefficient of friction and the inability of foreign substances to adhere to the material when submerged in a particular fluid medium for extended periods of time.

One method to retrofit a lining within a pipe, according to one presently preferred embodiment of the present invention, includes the step of determining the inner diameter of the submerged pipe. After the inner pipe diameter has been determined, a first section of the lining material is installed within the submerged pipe at the inlet or outlet end thereof. The first section of lining material has a first predetermined length, a first predetermined outer diameter and a first predetermined inner diameter. Lastly, the installed lining material is secured against any lateral movement within the submerged pipe.

The next step of retrofitting the submerged pipe is to add another section of lining material in abutting engagement with the first or preceding section of lining which has already been successfully secured within the pipe. This section of lining material has a second predetermined length, a second predetermined outer diameter and a second predetermined inner diameter. The process is continued until substantially the entire length of the pipe which is submerged in the fluid medium has been lined with the preselected lining material.

When the length of submerged pipe has been substantially lined, the subsequent length of the final section of lining material can be determined. The final section of lining material will have a third predetermined outer diameter and a third predetermined inner diameter. The final section of lining material will be installed in the submerged fluid transport system at the opposite one of the previously lined inlet end or outlet end. The final section of the lining material is placed in abutting engagement with the last previously installed section of lining material. The final section is then secured as to prevent lateral movement.

In addition to a retrofit lining method, another embodiment of the present invention provides an improved method of manufacturing a pipe for the fluid transport system which can be used in transporting preselected fluid mediums. Once again, this improved method of manufacturing, and the properties of the material itself, will provide for a significant reduction in both an adherence to and a buildup of substantially any detrimental foreign substance on the inner surface of the fluid transport system for an extended period of time. The actual pipe can be made of a single material component, such as a particular plastic, or as a composite, such as a fiber glass and plastic mat product. The steps necessary to manufacture the pipe begin with a determination of the length and inner diameter of pipe needed to transport the preselected fluid medium. Similar to the retrofit method, the entire length of pipe is then lined with a preselected lining material which is capable of resisting any adherence to or buildup of detrimental foreign substances on the inner surface of the pipe or lining. Finally, the lining is secured against lateral movement inside the pipe.

The present invention, in another embodiment, provides a pipe used for transporting e preselected fluid medium having a foreign substance therein which will tend to adhere to and buildup on an inner surface of the pipe, such pipe being capable of significantly reducing such adherence to and buildup of such foreign substance on the inner surface of the pipe. The improved pipe comprises ultrahigh molecular weight polyethylene having each of a predetermined length, a predetermined outer diameter, a predetermined inner diameter, a predetermined coefficient of friction and a predetermined impact strength.

In still another alternative embodiment, the present invention contemplates a method of preventing adherence to an build up of Zebra Mussels on abutting surfaces of underwater structures. This method includes the step of adhering a preselected lining material to a flat surface of such underwater structures. The preselected lining material having a predetermined coefficient of friction which is at least sufficient to prevent the adherence to and build up of Zebra Mussels on the preselected lining material.

The present invention, in another alternative embodiment, covers methods of fluid pipe manufacture and retrofitting in which a smaller diameter lining material is used to create an annular space between the lining and pipe. A foam or other hardenable material is then injected into the annular space to act as a securing means for securing the liner material to the pipe.

The present invention, in yet another alternative embodiment, contemplates a coating composition which will substantially minimize undesirable adherence to and build up of marine organisms on an exposed surface of an underwater structure when the coating composition is applied to such exposed surfaces. This coating composition is capable of being applied to such exposed surfaces of the underwater structures while they are submerged beneath the surface of the water. This coating composition comprises an epoxy gel component which is present in the coating composition in a first predetermined volume percent. A hardening agent is present in the coating composition in a second predetermined volume percent. The final essential element of the coating composition is at least one preselected marine organism anti-fouling material present in the coating composition in a third predetermined volume percent.

In another alternative embodiment, the present invention also provides a method of coating an exposed surface of an underwater structure while such underwater structure is submerged in a fluid medium with a coating composition which will substantially minimize undesirable adherence to and build up of marine organisms on an exposed surface of such underwater structure. This method includes the steps of removing any loose material on the surface of the structure to be coated. Thereafter, applying a predetermined thickness of an epoxy based coating material to the exposed surfaces of the underwater structure and allowing the coating to cure.

Finally, the present invention provides a system to substantially minimize undesirable adherence to and build up of marine organisms on the exposed surfaces of a water intake system. According to this embodiment, a chemical injection system is positioned a predetermined distance from the inlet port of the submerged pipeline for injecting preselected chemicals which will prevent marine organisms adhering to the inner surface of pipe and other downstream equipment. The system also includes lining or coating the entry portion of the water intake system and associated screens etc. with a preselected material which will prevent adherence to and build up of marine organisms on the exposed surfaces. This coating or lining will extend from the inlet port of the pipeline inwardly to, the equipment for injecting the chemicals into the stream.

OBJECTS OF THE INVENTION

It is, therefore, one of the primary objects of the present invention to provide a method for retrofitting and a method of manufacturing a fluid transport system with a preselected material which can be used as either a lining of a pipe or the pipe itself.

Another object of the present invention is to provide a preselected material which is capable of substantially minimizing both the detrimental adherence to and buildup of foreign substances which can restrict the flow of the fluid medium through the inner surface of a pipe.

Yet another object of the present invention is to provide either a single component or composite pipe material with a low coefficient of friction and which is also durable and convenient to service.

Still another object of the present invention is to provide a low cost solution to the buildup of detrimental foreign substances on the inner surface of a submerged fluid transport system.

An additional object of the present invention is to provide a low-cost fluid transport system with excess capacity to take into account a minimum amount of adhesion and buildup of a foreign substance within the fluid transport system.

Another object of the present invention is to provide a method of securing the preselected lining material to the fluid transport system, including but not limited to the use of a hardening foam, a mechanical means or friction itself.

A still further object of the present invention is to provide either a coating or a lining material for and a method of preventing build up of Zebra-Mussels in the locks and dams of a water control system.

It is an additional object of the present invention to provide a coating composition which can be applied to the exposed surfaces of an underwater structure while such structure is submerged and which coating composition will substantially prevent adherence to and build up of marine organisms thereon.

Still yet another object of the present invention is to provide a method of coating an exposed surface of an underwater structure while it is submerged in a fluid medium.

Another object of the present invention is to provide a system for preventing the adherence to and build up of marine organisms in a water intake system.

In addition to the above described objects and advantages of the present invention, various other objects and advantages of the invention will become mole readily apparent to those persons who are skilled in the fluid transport art from the following more detailed description, particularly, when such description is taken in conjunction with the attached drawing figures and with the appended claims.

DESCRIPTION OF THE PRESENTLY PREFERRED AND ALTERNATIVE EMBODIMENTS OF THE INVENTION

Prior to proceeding to the more detailed description of the invention, it should be noted that, for the sake of clarity, identical components, having identical functions have been identified with identical reference numerals throughout the several drawing Figures.

According to the present invention, one of the main considerations when choosing a pipe material or lining will be the material's coefficient of friction. It is suggested by the present invention and by one of the preferred embodiments that a lining material with a low coefficient of friction, the coefficient of friction will preferably be equal to or less than approximately 0.07, would allow a foreign substance to slide along the inner surface of the pipe while simultaneously preventing the initial adhesion of such foreign substance. For instance, the foreign substance could include algae and/or other types of living organisms. Thus, it is postulated that if the foreign substance is prevented from adhering to a surface of the fluid transport system, there can be no buildup.

Another important consideration in the development of the present invention was whether to manufacture a fluid transport system of one type of material or to develop a composite pipe material which would encompass a variety of properties. When a pipe composite is to be used the list of potential materials for the outer shell or casing includes, but is not limited to, iron, steel, aluminum, plastic, fiber glass and ceramic. In making the material choice, the fluid medium being transported would normally have to be taken into consideration.

Once the composition of the pipe material has been chosen, an appropriate lining material can be selected. For instance, a lining material can be selected from the group of materials consisting of ultrahigh molecular weight polyethylene, polytetrafluoroethylene, or lubricating paints. This lining material is then preferably impregnated with a material selected from the group consisting of copper metal, organotin, potassium permanganate and various mixtures thereof.

The next problem addressed by the present invention was how to retrofit a fluid transport system when it was operational and submerged in the fluid medium. The present invention suggests starting at one end of the piping system, lining the pipe section by section. Each section of lining material is placed in abutting engagement to the preceding section of lining material and secured to prevent any lateral movement within the existing pipe.

Prior to the aforementioned retrofit of the submerged pipes with the lining material selected, it is also within one of the preferred embodiments of the invention to include the additional step of determining the extent of foreign substance adhering to the inner surface of the pipes in the fluid medium. When the buildup has been determined and it is found to be of a predetermined amount, the method of the present invention includes the additional step of cleaning the foreign substance from the inner surface of the pipe prior to retrofitting the lining therein.

Figure 1:
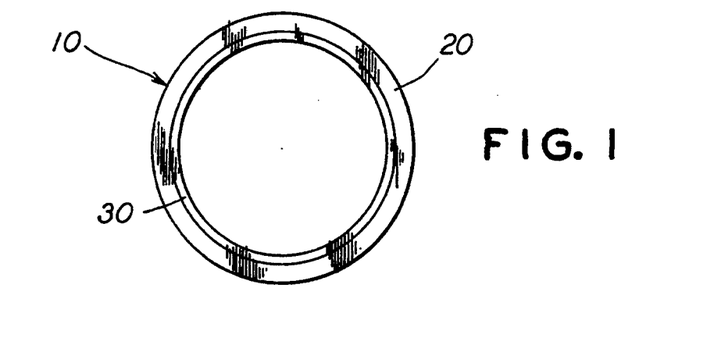
FIG. 1 is a front elevation view of an improved pipe composite configuration of the present invention.

Referring now, more particularly, to FIG. 1 of the drawings, there is illustrated schematically an improved pipe composite, generally designated 10. The improved pipe composite 10 consists of the outer preselected pipe casing 20 (hereinafter referred to as the "pipe casing 20") and the preselected lining material 30 (hereinafter referred to as the "lining material 30"). This simplest configuration of the preferred embodiment can be accomplished through a retrofit process or through a manufacturing process prior to the use of the improved pipe composite 10.

Retrofitting any given fluid transport system (not shown), such as water intake pipes, with a lining material 30 while the system is submerged in a fluid medium (not shown) provides the capability to substantially minimize both the detrimental adherence to and the buildup of a foreign substance (not shown) on the inner surface of the pipe casing 20. The method of retrofitting begins by first determining the inkier diameter of the submerged pipe casing 20. Next, the installation of the lining material 30 can begin at either the inlet or outlet end of the fluid transport system. A section of lining material 30 is secured to the inner surface of the pipe casing 20. The lining material 30 has a first predetermined length, outer diameter and inner diameter. The process of adding lengths of lining material 30 in abutting engagement continues until the entire length of pipe casing 20 comprising the fluid transport system has been lined.

Figure 2:
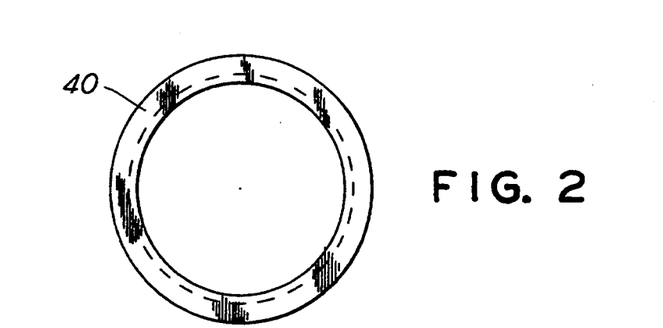
FIG. 2 is a front elevation view of an improved pipe composite, as illustrated in FIG. 1, with an end cap.

FIG. 2 illustrates schematically one method of securing the lining material 30 to the pipe casing 20. The method shown in the drawing uses an end cap 40. As mentioned previously, the end cap 40 will restrain the lining material 30 from any lateral movement caused by a number of sources including the flow of the fluid medium itself.

Figure 3:
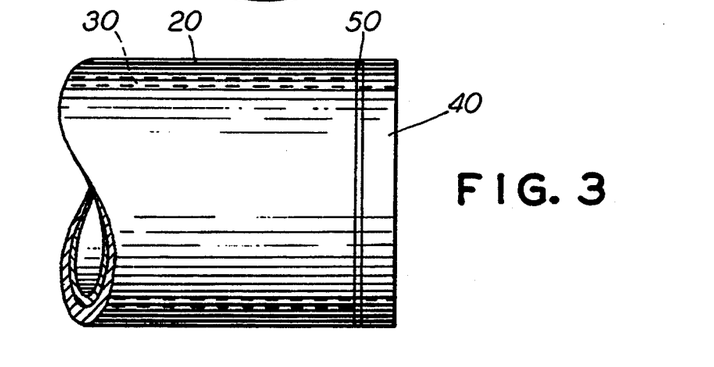
FIG. 3 is a sectional side view of an improved pipe composite with an end cap, as illustrated in FIG. 2.

FIG. 3 depicts a sectional side view of an improved pipe composite 10 using the end cap 40 securement method as shown in FIG. 2. The weld 50 secures the end cap 40 to the improved pipe composite 10.

The method of retrofitting a fluid transport system may also include the additional step of determining the extent of foreign substance adhering to the inner surface of the pipe casing 20 while the fluid transport system is still submerged in the fluid medium. Once the extent of foreign substance buildup has been determined the inner surface of the pipe casing 20 can be cleaned if necessary to provide adequate fluid flow.

Figure 4:
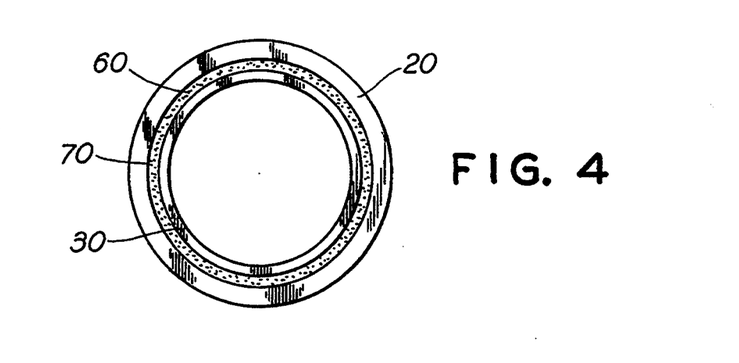
FIG. 4 is a front elevation view of the configuration of the present invention utilizing hardenable foam in the annular space of an improved pipe composite.
Figure 5:
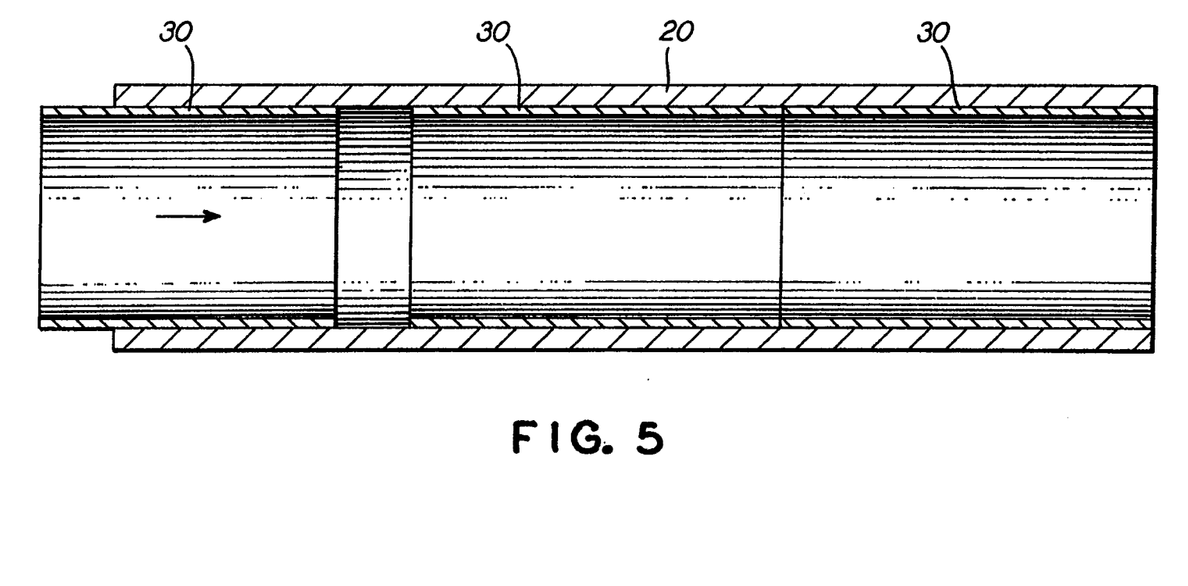
FIG. 5 is a cross-sectional view through an elongated section of a pipe in which two lining sections have been installed, and a third lining section is being installed, pursuant to the process of this invention.

Another embodiment of the improved pipe composite 10 is shown schematically in FIG. 4. FIG. 4 illustrates the retrofit method in which the outer diameter of the inner lining material 30 is less than the inner diameter of the outer pipe casing 20. This difference in diameters creates an annular space 70 between the aforementioned materials. A flowable and hardenable material, such as hardenable foam 60, is then injected into the annular space 70 to secure the lining material 30 to the pipe casing 20. The injection of materials, such as hardenable foam 60, can be accomplished while the fluid transport system is still submerged in the fluid medium. A variety of foam mixtures can be used for this purpose.

In addition, other methods of securing either prelined or retrofitted improved pipe composites 10 are addressed in the present invention. Securing the inner casing of lining material 30 to the outer pipe casing 20 before it is submerged is a much easier task than securing lining material 30 sections during retrofit. Other securing methods which can be used for pre-submerged pipe casings 20 would include a mechanical method, such as springs, or by friction itself. It may also prove to be advantageous to the cleaning process to utilize a method of mechanical securement which is removable, such as the use of the end cap 40 illustrated in FIGS. 2 and 3.

Other embodiments of the present invention can be accomplished by modifying the described and illustrated improved pipe composite 10. For instance, instead of using a retrofit process, the present invention also teaches an improved method of manufacturing a pipe composite. The manufactured pipe composite can then be used to create or replace an existing fluid transport system. The pipe composite will also prevent the buildup of unwanted foreign substances. In this embodiment, the inner diameter of the pipe casing 20 and the outer diameter of the lining material 30 will preferably be substantially equal. A securement means will also be used to pro,vent lateral movement.

The present invention further teaches the embodiment in which the fluid transport system consists of pipes made of the preselected lining material 30. In the preferred embodiment, the pipe is made of ultrahigh molecular weight polyethylene and has an impact strength of at least 38 ft.lb./sq.in. The pipe could also be fiber reinforced and impregnated with a material selected from the group consisting of copper metal, organotin, and mixtures thereof.

According to another important aspect of the present invention it should be noted that the lining material 30, illustrated as a pipe lining, can also be used effectively as a lining material for flat surfaces such as on locks and dams where Zebra Mussels are present to ensure that they will not adhere to these surfaces thereby eliminating the problems in closing such locks and dams.

The present invention in another embodiment provides a coating composition which will substantially minimize the undesirable adherence to and buildup of marine organisms, found in many water systems, on the exposed surfaces of underwater structures when it is applied to these exposed surfaces. Examples of such exposed surfaces include, but are not limited to, the inner surface of the pipe portion of a water intake system and the exposed surfaces of the various valves, fittings and other auxiliary equipment of a water intake system. Additionally, this coating composition can be applied to the exposed surfaces of boat hulls, ships, buoys, etc.

This composition consists of an epoxy gel component present in such coating composition in a first predetermined weight percent. Such predetermined weight percent of the epoxy gel component will normally be between about 27.0 weight percent and about 52.5 weight percent. Preferably, this predetermined weight percent will be in the range of between about 27.0 weight percent and about 35.0 weight percent. Additionally the epoxy gel component is selected for its capability of being applied to the exposed surfaces of the above-mentioned equipment while they are still submerged in water. A hardening agent is provided and is selected for its capability of allowing such coating composition to cure under water. This hardening agent is present in the coating composition in a second predetermined weight percent. Such second predetermined weight percent will normally be in a range of between about 8.0 weight percent and about 17.5 weight percent of the coating composition. Preferably, this predetermined weight percent will be in the range of between about 8.0 weight percent and about 10.0 weight percent.

Finally, the coating composition includes a preselected marine organism anti-fouling material which is present in the coating composition in a third predetermined weight percent, which will normally be in a range of between about 30.0 weight percent and about 65.0 weight percent of the coating composition. Preferably, this predetermined weight percent will be in the range of between about 50.0 weight percent and about 65.0 weight percent. Such preselected marine organism anti-fouling material preferably is selected from the group consisting of copper and a mixture of copper and organotin. Or, her elements such as potassium permanganate may be present if desired. Preferably the copper is copper metal because it has been found to be the most effective anti-fouling agent.

The present invention further provides a method of against foreign substance buildup. The predetermined thickness of such coating is then allowed to cure. Normally, the thickness of the coating will be in a range of from about 1-16th of an inch to about 1 ½ inches. Greater thicknesses may be applied if required or desired depending upon the location of the coating. For example, if the coating will be contacted by heavy objects, it may be desired to provide a greater thickness in the presently preferred embodiment of this method. The surface of the coating will preferably be abraded after curing, thereby exposing a greater portion of such preselected marine organism anti-fouling material. Depending upon the length of time the exposed surfaces of the underwater structures to receive the coating thereon has been submerged, cleaning of such exposed surfaces may be required before coating.

In a final aspect of the present invention there is provided a system for retrofitting a water intake system which will substantially minimize undesirable adherence to an buildup of marine organisms on the exposed surfaces of such water intake system. This system includes a chemical injection means disposed within a pipe portion of the water intake system a predetermined distance from an inlet end of the pipe. Such chemical injection means will inject into the water stream at least one of chlorine, chlorine-activated bromide, oxidants and various mixtures of these chemicals. The predetermined distance such chemical injection means is disposed from the inlet end of the pipe will be at least sufficient to prevent the chemicals being injected into the water stream being transferred to the main body of water, preferably this distance will be about 200 feet. The system further includes a preselected coating composition described above disposed on the exposed surfaces of the auxiliary structures of the water intake system located adjacent such inlet port, for example, trash racks, screens, etc. The final essential element of this system is lining the inner surface of the water intake pipe from the inlet end to the chemical injection means with at least one of a preselected lining material or with the coating composition described above. If the lining is chosen in this system it will preferably be an ultrahigh molecular weight polyethylene impregnated with at least one of copper, organotin, and mixtures thereof.

Although a number of presently preferred and alternative embodiments of the present invention have been shown and described in detail above, it should be understood, by those persons who are skilled in the fluid transportation art that many changes and modifications may be made therein without departing from the spirit and the scope of the appended claims.

I claim:

1. A method of substantially minimizing both detrimental adherence to and buildup of living marine organisms on the inner surface of a pipe submerged in a fluid medium containing said living marine organisms, wherein said living marine organisms restrict flow of said fluid medium through said pipe, said method of substantially minimizing both detrimental adherence to and buildup of living marine organisms on an inner surface of said pipe comprising the steps of:

retrofitting a predetermined lining material adjacent to said inner surfaces in said pipe which resists both said detrimental adherence to and buildup of said living marine organisms on said inner surface of said pipe, said retrofitting of said predetermined lining material includes the steps of;

(a) determining an inner diameter of said pipe submerged in said fluid medium containing said living marine organisms to be lined with said preselected lining material, p2 installing a first section of said preselected lining material within said pipe submerged within said fluid medium containing said living marine organisms and adjacent to one of an inlet end and an outlet end thereof, said first section of said lining material having a first predetermined length, a first predetermined outer diameter, which is at least one of substantially equal to and less than said inner diameter of said pipe, and a first predetermined inner diameter, (c) securing said first section of said preselected lining material, installed in step (b), against lateral movement within said pipe submerged in said fluid medium containing said living marine organisms, (d) installing another section of said preselected lining material within said pipe submerged in said fluid medium containing said living marine organisms and in abutting engagement with a previously installed section of said preselected lining material, said another section of said preselected lining material having a second predetermined length, a second predetermined diameter, which is at least one of substantially equal to and less than said first predetermined inner diameter of said pipe, and a second predetermined inner diameter of said pipe and a, second predetermined inner diameter, (e) repeating step (d) until substantially an entire length of said pipe submerged in said fluid medium containing said living marine organisms has been lined with said preselected lining material, (f) determining a length required for a final section of said preselected lining material to be installed within said pipe submerged in said fluid medium containing said living marine organisms, (g) providing said final section of said preselected lining material to said length, determined in step (f), said final section of said preselected lining material having a third predetermined outer diameter, which is at least one of substantially equal to and less than said first predetermined inner diameter of said pipe, and a third predetermined inner diameter, (h) installing said final section of said preselected lining material within said pipe submerged in said fluid medium containing said living marine organisms and adjacent an opposite one of said inlet end and said outlet end having said first section of preselected lining material installed therein, one end of said final section of said preselected lining material being placed in abutting engagement with a last previously installed section of said preselected lining material installed in step (e), and (i) securing said final section of said preselected lining material, installed in step (h), against lateral movement within said pipe submerged in said fluid medium containing said living marine organisms.

2. A method of substantially minimizing both detrimental adherence to and buildup of living marine organism on an inner surface of a pipe submerged in a fluid medium containing said living marine organisms, according to claim 1, wherein prior to step (b) said method includes the additional step of determining an extent of said living machine organisms adhering to said inner surface of said pipe submerged in said fluid medium containing said living marine organisms.

3. A method of substantially minimizing both detrimental adherence to and buildup of living marine organisms both an inner surface of a pipe submerged in a fluid medium containing said living marine organisms, according to claim 2, wherein said method includes the additional step of cleaning said living marine organisms from said inner surface of said pipe when a predetermined amount is determined to exist.

4. A method of substantially minimizing both detrimental adherence to and buildup of living marine organisms on an inner surface of a pipe submerged in a fluid medium containing said living marine organisms, according to claim 1, wherein said inner diameter of said pipe submerged in said fluid medium containing said living marine organisms is greater than each of said first predetermined outer diameter of said first section of said preselected lining material and said second predetermined outer diameter of said another section of said preselected lining material and said third predetermined outer diameter of said final section of said preselected lining material, thereby providing an annular space adjacent said inner diameter of said pipe submerged in said fluid medium containing said living marine organisms and said method includes the additional step of injecting a flowable and hardenable material into said annular space.

5. A method of substantially minimizing both detrimental adherence to and buildup of living marine organisms on an inner surface of a pipe submerged in a fluid medium containing said living marine organisms, according to claim 1, wherein said securing in each of steps (c) and (i) is achieved by frictionally engaging said preselected lining material with said inner diameter of said pipe.

6. A method of substantially minimizing detrimental adherence to and buildup of living marine organisms on an inner surface of a pipe submerged in a fluid medium containing said living marine organisms, according to claim 1, wherein said method includes the additional step of preselecting a coefficient of friction of said preselected lining material.

* * * * *

UNITED STATES PATENT AND TRADEMARK OFFICE
CERTIFICATE OF CORRECTION

PATENT NO. : 5,380,128
DATED : January 10, 1995
INVENTOR(S) : Clois D. Fears

It is certified that error appears in the above-indentified patent and that said Letters Patent is hereby corrected as shown below:

```
Column 1, line 19, delete "material" and insert --materials--.
Column 3, line 15, delete "all" and insert --an--;
column 3, line 53, delete "Left" and insert --left--;
column 3, line 68, insert --.-- before The.
Column 4, line 43, delete "0.003-0,005" and insert
--0.003-0.005--.
Column 5, line 24, delete "linking" and insert --lining--.
Column 6, line 31, delete "e" and insert --a--.
Column 7, line 36, delete "," after to.
Column 8, line 20, delete "mole" and insert --more--;
```

UNITED STATES PATENT AND TRADEMARK OFFICE
CERTIFICATE OF CORRECTION

PATENT NO. : 5,380,128
DATED : January 10, 1995
INVENTOR(S) : Clois D. Fears

It is certified that error appears in the above-indentified patent and that said Letters Patent is hereby corrected as shown below:

```
Column  9, line 54, delete "inkier and insert --inner --.
Column 10, line 54, delete "pro,vent" and insert --prevent --.
Column 11, line 48, delete "Or,her" and insert --Other --.
Column 12, line 55, delete "p²" and insert --(b) --.
Column 13, line 14, delete "," after a;
Column 13, line 49, delete "organism" and insert --organisms --.
Column 14, line 10, delete "both" and insert --on --.
Column 14, line 42, insert "both" after minimizing.
```

Signed and Sealed this

Twenty-fifth Day of April, 1995

BRUCE LEHMAN

Attest:

*Attesting Officer*      *Commissioner of Patents and Trademarks*